J. G. Perry.
Harvester.
Nº 86584. Patented Feb. 2, 1869.
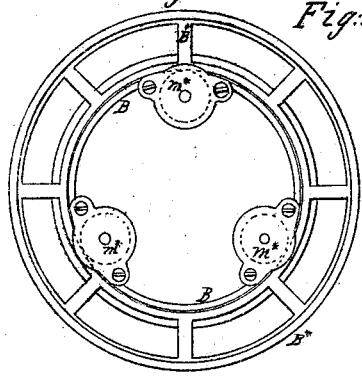 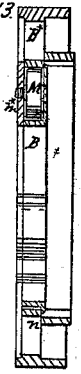 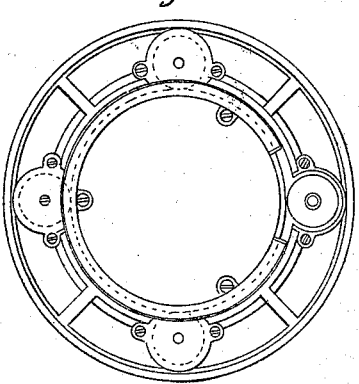 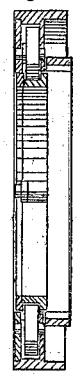
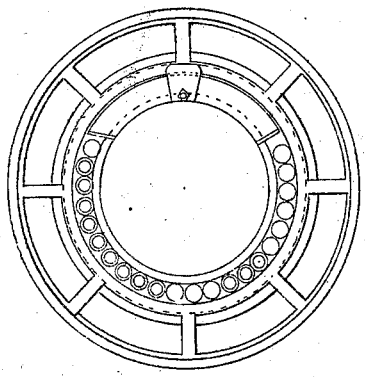  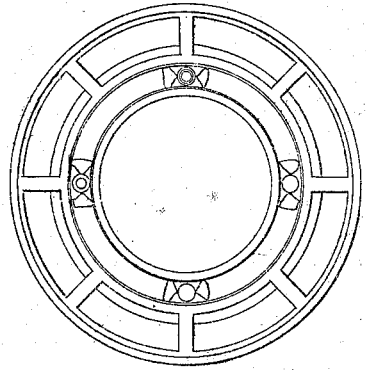 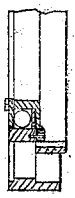
Witnesses
A. Leclerc
A. Kinnier
Inventor
J. G. Perry
per Brown, Coombs & Co.
attys

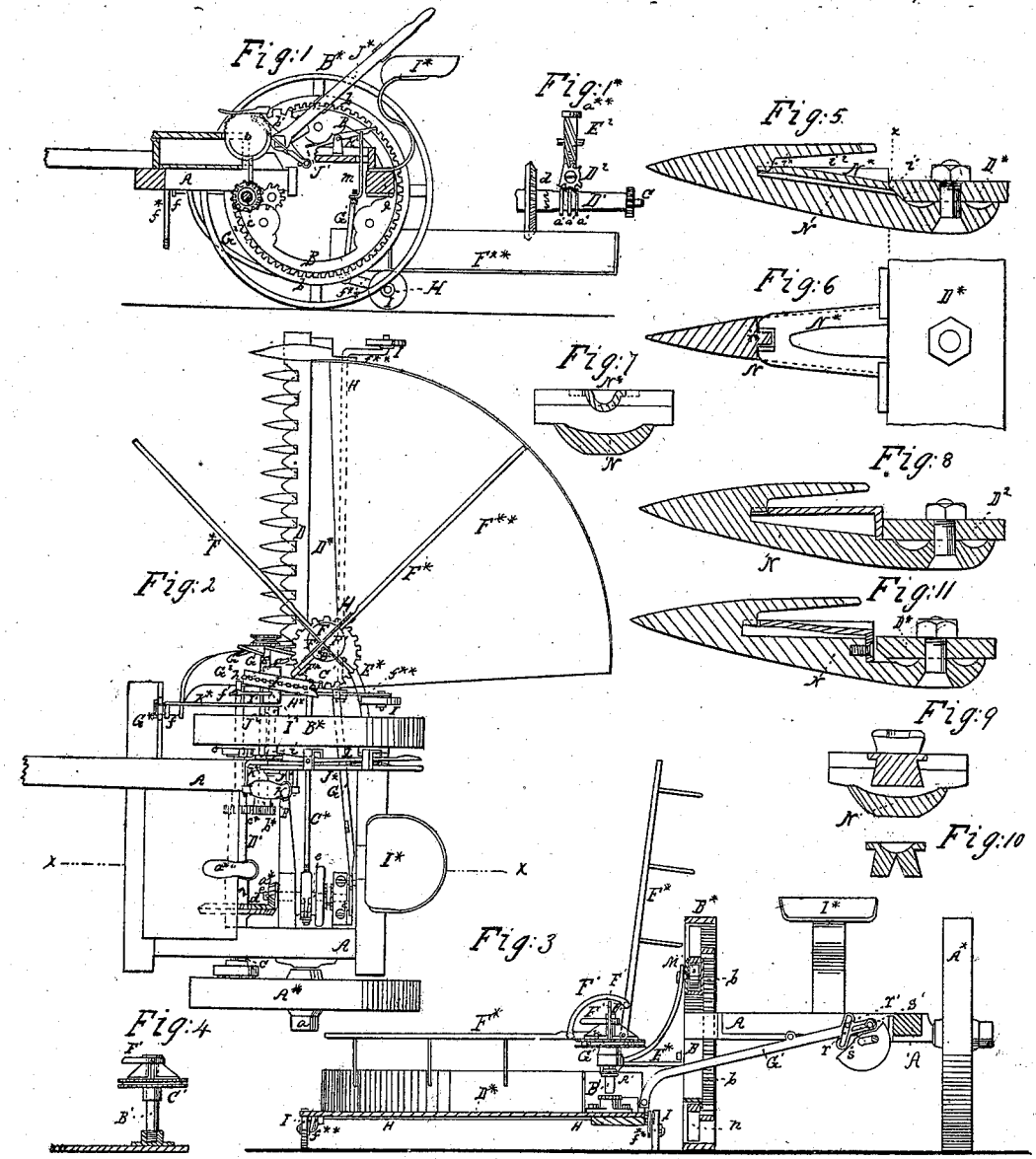

UNITED STATES PATENT OFFICE.

J. G. PERRY, OF KINGSTON, RHODE ISLAND.

IMPROVEMENT IN HARVESTERS.

Specification forming part of Letters Patent No. 86,584, dated February 2, 1869.

*To all whom it may concern:*

Be it known that I, J. G. PERRY, of Kingston, in the county of Washington and State of Rhode Island, have invented certain new and useful Improvements in Grain and Grass Harvesters; and I do hereby declare that the following is a full, clear, and exact description of the same, reference being had to the accompanying drawings, making a portion of this specification, in which—

Figure 1 is a vertical transverse section of a harvester made according to my invention, taken in the line $x\ x$ of Fig. 2. Fig. 1* is a detached view of one portion of the same. Fig. 2 is a plan view of the same. Fig. 3 is a vertical transverse section of the same, taken at right angles to Fig. 1. Fig. 4 is a detached view of one portion of the same attached to the finger-bar or shoe. Fig. 5 is a longitudinal section, showing one of the guard-fingers of the harvester. Fig. 6 is a horizontal section of the same. Fig. 7 is a vertical transverse section of the same, taken in the line $y\ y$ of Figs. 4 and 5. Fig. 8 is a vertical longitudinal section, and Fig. 9 a transverse section, representing a modified form of guard-finger. Fig. 10 is a detached view indicating a variation in the construction represented in Figs. 8 and 9. Fig. 11 is a vertical longitudinal section of another form of guard-finger. Fig. 12 is a side view of the driving-wheel of the harvester as applied to its hollow axle. Fig. 13 is a vertical section showing the same, and taken at right angles to Fig. 12. Fig. 14 is a side view, and Fig. 15 a transverse section, of a modified form of driving-wheel and appliances thereof. Fig. 16 is a side view, and Fig. 17 a transverse section, of another form of driving-wheel, &c. Fig. 18 is a view, with side plate removed, of another form of driving-wheel; and Fig. 19 is a partial transverse section of the same.

Similar letters of reference indicate corresponding parts in all the figures.

This invention consists in certain novel combinations and arrangements of parts, whereby the facility and efficiency with which a grain or grass harvester may be operated are very materially increased as compared with those hitherto in use.

To enable others to understand the construction and operation of my invention, I will proceed to describe it with reference to the drawings.

The horizontal frame A is furnished at one side with a short axle, $a$, and at the other with an annular or hollow axle, B. Upon these axles, respectively, are placed the two supporting-wheels, A* and B*, each of which is furnished, at its inner side, with an internally-toothed rim, $b$.

The rims $b$ of the two wheels first mentioned gear into loose pinions $c$, carrying pawls working into ratchet-wheels secured on the ends of a shaft, C, which carries a bevel-wheel, $d$, gearing with a bevel-pinion, $a^*$, on the end of the crank-shaft $e$, which latter actuates the pitman C* of the sickle D of the finger-bar D*.

The bevel-gear wheel $d$ is loose upon the shaft C, but is made fast thereto, when the machine is in operation, by means of a sliding sleeve, $D^1$, placed upon the shaft C, and caused to turn therewith by means of an internal groove and feather, the adjacent surfaces or ends of the sleeve and the hub being shaped to constitute a suitable clutch.

In order to provide for the longitudinal movement of the sleeve requisite in thus throwing the shaft C in or out of gear with the sickle-driving mechanism, it is furnished with several circumferential or annular ribs, $a'$, and pivoted to the adjacent portion of the frame is a "working-piece," $D^2$, the lower end of which is provided with teeth gearing or meshing between the annular ribs of the sleeve $D^1$, and which is also furnished at its upper end with similar teeth, which fit the spirally grooved or ribbed rear surface of a vibrating disk, $E^2$, attached to the frame, and capable of being worked to and fro by the application of the foot to a foot-piece, $a^{**}$, secured to the top thereof, so that by simply tilting the disk backward it will operate the toothed working-piece to move the sleeve outward, and thus unclutch the bevel-gear wheel from the shaft.

Provided within the hollow axle B, at the forward side thereof, is a bearing which sustains a shaft, E, the inner end of which is furnished with a pinion, $b^*$, which, when the sleeve $D^1$ is clutched with the bevel-gear wheel $d$, as hereinbefore explained, gears into a corresponding pinion, $c^*$, provided upon the outermost end of the sleeve, the two pinions being so arranged that when the sleeve is moved outward to unclutch the bevel-gear wheel from the shaft, the pinion $c^*$ will be brought out of gear with the other one, $b^*$, in order that the movement of the rake-operating devices driven by the shaft E, and hereinafter presently fully described, may be stopped simultaneously with that of the sickle-driving mechanism.

Firmly bolted or otherwise secured to the hollow axle B, and extending outwardly therefrom, is a strong bracket, E*, underneath the other end of which is a plate, A', in which is a square hole, arranged immediately under a circular hole or bearing formed in the adjacent outer portion of the bracket. The square hole in the plate A' receives the squared lower end of a shaft, B', and prevents such shaft from turning. Upon the cylindrical central portion of this shaft is fitted the cylindrical sleeve-like hub of a worm or chain wheel, C', such hub being fitted in its turn into the bearing just mentioned in the outer part of the bracket. The upper end of the shaft B' projects upward beyond the top of the worm or chain wheel, and has attached thereto a cam or eccentric, F, the office of which will presently herein appear.

The revolving rakes and gatherers are indicated at F, and are attached to the upper side of the worm or chain wheel by horizontal pivots, and are arranged in pairs, the two heads opposite each other being connected, by arc-shaped braces F', in a position at an obtuse angle from each other, as shown in Fig. 3.

Provided upon the outer end of the shaft E is a series of spiral fan-shaped blades, G, which gear into the teeth of the worm-wheel C', and operate something after the manner of a worm, to communicate a rotary movement to such worm-wheel, thus enabling the shaft E to give a rotary motion around the shaft B' to the rakes and gatherers F*.

Instead of the shaft E, motion may be communicated to the worm-wheel direct from the shaft $c$; or the shaft E, instead of being placed parallel with shaft $c$, and having square or spur pinions, may be placed at right angles to the shaft $c$ within the frame, and have bevel-gearing at the same point of contact, and connect with the worm-wheel through the open main wheel by the spiral blades G; or, instead of the spiral blades G, a belt or chain and chain-wheels may be used to impart motion from the shaft $c$, shaft E, or crank-shaft $e$ to the worm or chain wheel $c'$.

As the rake-heads are thus carried around in succession, each one, as it is brought in front of the eccentric F, is tilted forward by contact therewith until it falls to the horizontal position requisite in sweeping back over the platform F**, attached to and behind the finger-bar D* in any suitable way. As the forward rake or gatherer thus descends, the one with which it is connected, as hereinbefore explained, is brought thereby to a nearly-vertical position, so that as it is carried around it may pass the adjacent wheel of the machine without being interfered with thereby, the rakes and gatherers, as they are thus revolved, being let down in succession to gather the grain and sweep over the platform, and rake the grain therefrom, and lifted to pass the wheel.

The inner end of the finger-bar D* has extending forward therefrom an upwardly-curved arm or shoe, $G^2$, at the end of which is a spur, $f$, which works through a slotted plate, $f^*$, attached to a bar, G*, which extends laterally from the front part of the frame A. Near the rearmost edge of the same end of the finger-bar is pivoted the outer end of a bar, $G^1$, the inner extremity of which is attached, as hereinafter set forth, to the back of the frame, at the opposite side thereof. The finger-bar is by these means enabled not only to move vertically, but to have its forward edge raised or depressed, as may be desired.

Working through suitable bearings provided at the rearmost edge of the finger-bar D* is a rod, H, placed parallel with the finger-bar, and furnished at each end with a backwardly-extending arm, $f^*$, at the outer extremity of which is arranged a caster-wheel, I. The inner end of the rod H is, furthermore, furnished with a forwardly-extending lever, H*, in such manner that, by lifting this lever through any suitable agencies worked from the seat L of the machine, the rod H may be turned to bring the caster-wheels I farther forward with reference to the finger-bar, thereby lifting the same a uniform distance throughout its entire length. For the sake of greater convenience in thus operating the finger-bar, the extremity of the lever H* is connected by a chain, $f'$, with a lever-arm, $I^1$, extending forward and upward from the outer portion of a shaft, $I^2$, working through the upper forward portion of the hollow axle, and which is also provided with an arc, J, over which a chain, $h$, passes down to and is connected with the rear portion of the arm or shoe $G^2$.

The inner end of the shaft just mentioned is provided with a hand-lever, J*, and foot-lever $J^1$, whereby the shaft may be rocked or turned so as to simultaneously operate the lever H* to work the rod H with its casters I, and the arc J with its chain $h$, to lift the finger-bar.

The hand-lever may be held back, to retain the finger-bar in its elevated condition, by a pawl, L, pivoted thereto and fixed to the inner side of the hollow axle.

The shaft $I^2$, just described, passes through a tubular shaft, $J^2$, which is sustained in appropriate bearings formed in the hollow axle, and which has at its inner end a foot-lever, K, and at its outer extremity a forwardly-projecting arm, K*, which, being curved downward, is bent loosely around the spur $f$ of the shoe $G^2$, so that by forcing downward the forward or rear portion of the foot-lever K, the arm K* will hold the shoe $G^2$ at any point desired, as the case may be, so that by this means the angle to the ground of the cutting appliances may be raised or lowered at will.

Pivoted upon the frame A, in suitable proximity to the seat of the machine, is a tilting foot-piece, K², from the rear end of which there extends downward a rod, $m$, which is hooked into the bar G¹, so that by pressing down upon the rear portion of this foot-piece, the bar G¹, and, consequently, the cutting apparatus, may be held down at will for close cutting. On the other hand, by depressing the forward portion of the foot-piece, the bar G¹ and the cutting apparatus may be lifted to conform to the various surfaces, and run lightly along, and so that the cutters may be readily made to pass over any obstacle of ordinary height or character; and as, in elevating the cutters, it is necessary, at the same time, to elevate the raking apparatus to a corresponding extent, I arrange the vertical shaft B′, around which the worm-wheel G¹, carrying the rakes, rotates, at the inner end, in rear of the finger-bar, above the platform, and in sliding journals, as elsewhere described, so as to be lifted by the rise of the platform without being thrown out of gear with the spiral blades G or other operating medium.

The method of securing the wheel B* upon its hollow axle B is as follows: The axle is formed externally with cavities or recesses $n$, open at the circumference of the axle, and designed to receive friction-rollers M, which are so arranged that when the wheel is placed upon the axle the rollers will be interposed between the two, so as to diminish the friction which would otherwise occur. One end of the pivot or axle of each friction-roller is fitted into a hole or bearing provided in the fixed or permanent side of the recess, and the other end of which fits into a like bearing formed in a detachable side piece, $m^*$, bolted or screwed fast to close the outer or opposite side of such recess. These side pieces $m^*$ are made to project beyond the adjacent inner edge of the wheel, and, a flange, $n$, being provided upon the axle at the opposite side of the wheel, serve to retain the wheel in its place, as well as to furnish a support for one end of each roller-pivot, as just explained.

It is highly desirable that when the finger-bar is lifted in a horizontal position, as hereinbefore fully explained, its movement should be truly vertical; and in order to insure this, the inner end of the bar G¹, instead of having its inner end attached to the rear of the frame A simply by a pivot, has its inner end formed with an oblique slot, $r$, through which passes a fixed pin, $r'$, and with a longitudinal slot, $s$, through which is passed another pin, $s'$. The oblique slot $r$, when the cutter-bar is lifted, as just mentioned, enables the bar to move inward to such degree as to insure the requisite vertical direction in the upward movement of the same, thus obviating the outward and forward thrust which would otherwise occur in such movement by the movement upon the arc of a circle of the outer extremity of the bar.

The slotted guards or fingers N may be of any appropriate form, and are attached to the finger-bar in the usual or in any suitable manner.

Provided internally in the forward end of the slot or recess $i^2$ of the guard is a stud, $i^*$. The ledger-blade N* is of the form shown more fully in Fig. 5—depressed or recessed centrally at its rearmost portion, as indicated more plainly in Fig. 6, and notched at its forward end to fit astride the stud $i^*$, just mentioned, which prevents any lateral movement of the forward end of the ledger-blade, any upward movement of the same being provided against by the closeness with which it fits into the narrow portion of the slot or recess at either side of the stud.

The inner or rearmost end of the blade is provided with a small spur, $i^1$, which, fitting into a small notch formed for its reception at the back of the slot or recess in the guard, is held therein, to retain in place the inner end of the ledger-blade, by the adjacent edge of the finger-bar, as shown more fully in Figs. 5, 6, and 7.

Instead of being fastened in the precise manner just described, the inner end of the ledger-blade may be turned downward at right angles, as indicated in Figs. 8, 9, 10, and 11; the downwardly-extending spur thus formed being made of dovetail form, and fitted into a recess of corresponding shape formed in that portion of the guard immediately in front of the finger-bar, this dovetail spur being either solid, as in Fig. 9, or, as is preferred for the greater facility with which the ledger-blade as a whole may be manufactured, split or divided, as represented in Fig. 10. Instead of these methods, furthermore, the spur on the blade may be of any desired form, and fastened in place by a screw, as represented in Fig. 10.

It now remains to explain certain modified means of attaching the wheel B to the hollow axle represented in the figures, not hereinbefore adverted to, and which may be briefly explained as follows:

As shown in Figs. 13 and 14, the friction-rollers, instead of being arranged upon or carried by the hollow axle, are placed in suitable cavities formed in the inner peripheries of the wheel itself, and run in contact with the circumference of the axle.

When made as shown in Figs. 15 and 16, the axle is of less diameter than the internal diameter of the wheel, the space between them being occupied, for a greater or less portion of its circuit, by either cylindrical or spherical rollers, which serve to obviate friction in a manner similar to pivoted friction-rollers; or, in place of this arrangement, the spherical or cylindrical rollers may be placed singly between check-pieces arranged by twos at intervals on rings within the space between the axle and the wheel.

These friction-rolls may be made hollow, for lightness and strength combined, and instead of check-pieces arranged by twos, each roll may run on a pin or pivot made on the rings.

These open main wheels, as represented in Figs. 14 and 15, are secured upon their axle by means of the friction-rollers running in a groove made in the periphery of the axle, and those in Figs. 16 and 17 by flanges secured to the axle at opposite sides of the wheels, and those at Figs. 18 and 19 by flanges secured to the inner side of the wheel, extending over the axle, leaving the outside end of the axle covered, to guard against dirt, and the hub may project over the upper part of the axle, and the lower part of the axle over the hub, for more effectually keeping the dirt out of the joints.

Having thus described my improved grain and grass harvester, what I claim as my invention, and desire to secure by Letters Patent, is—

1. The arrangement of the vibrating disk $E^2$, grooved or ribbed spirally at its rear circumferential portion, the toothed working-piece $D^2$, and the annular ribs $a'$ of the sleeve D, clutching with the wheel $d$, whereby the sickle-driving mechanism may be thrown in or out of gear.

2. The arrangement of the spur-pinion $c^*$ of the sleeve $D^1$, clutching the wheel $d$, with reference to the spur-pinion $b^*$ of the rake-operating shaft E, substantially as and for the purpose described.

3. The arrangement of the spiral blades G of the shaft E with reference to the worm-wheel $C'$, carrying the revolving rakes, whereby the requisite rotary movement is given to the rakes.

4. The arrangement of the cam or eccentric F with reference to the wheel $C'$, carrying the revolving rakes, connected in pairs by braces $F'$, whereby the rakes may be raised and lowered automatically.

5. The arrangement of the bearing $A'$, provided on the bracket $E^*$, attached to the annular axle B of the wheel $B^*$, with reference to the lower end of the fixed shaft $B'$, having the cam or eccentric F at its upper end, whereby the retention of the cam or eccentric in proper position is secured.

6. The arrangement of the shaft $B'$, worm-wheel $G^1$, and operating-wheel G, with relation to the inner end of the platform, so that the raising of the latter shall elevate the rakes at the same time without throwing them out of gear, in the manner substantially as shown and described.

7. The arrangement of the foot-lever $J^1$, working an arm, $I^1$, attached to the chain $f'$, lever $H^*$, and the longitudinal rod H, situated back of the finger-bar, and having attached at either end thereof, by an arm, $f^{**}$, a wheel, I, whereby the lifting of the finger-bar and its attachments is provided for.

8. The arrangement of the tilting foot-bar $K^2$ and its rod $m$ with reference to the bar $G^1$, whereby the finger-bar may be either raised or held down, as may be desired.

9. So arranging the detachable side pieces $m^*$ of the friction-roller recesses $n$ that they shall serve the double purpose of supporting one end of the friction-rollers M and of retaining the wheel $B^*$ upon its annular axle B.

10. The arrangement of the oblique slot $r$ in the bar $G^1$ with reference to the pin $r'$ in the main frame, whereby the finger-bar is enabled to rise vertically.

JOHN G. PERRY.

Witnesses:
 ELISHA C. CLARKE,
 S. E. PERRY.